United States Patent [19]

Lowery

[11] 4,225,147
[45] Sep. 30, 1980

[54] VEHICLES

[76] Inventor: Michael B. Lowery, 228 Preston New Rd., Blackpool, Lancashire, England

[21] Appl. No.: 873,844

[22] Filed: Jan. 31, 1978

[51] Int. Cl.³ .............................................. B62K 9/00
[52] U.S. Cl. ................................................ 280/87.01
[58] Field of Search ................ 280/87.01 R, 87.02 R, 280/87.03, 87.04 R, 87.04 A, 87.05, 265, 268, 271, 94 R, DIG. 7, 21 R

[56] References Cited

U.S. PATENT DOCUMENTS

| 1,493,291 | 5/1924 | Starnes | 280/87.01 |
| 2,041,982 | 5/1936 | Doren | 280/21 R |
| 3,205,962 | 9/1965 | Anderson | 280/DIG. 7 |
| 3,362,722 | 1/1968 | Core | 280/87.04 A |
| 3,671,055 | 6/1972 | Aarup | 280/87.04 A |

FOREIGN PATENT DOCUMENTS

| 1005998 | 4/1952 | France | 280/DIG. 7 |
| 2315421 | 1/1977 | France | 280/87.04 R |
| 402904 | 12/1933 | United Kingdom | 280/282 |
| 741159 | 11/1955 | United Kingdom | 280/11.1 BR |
| 757663 | 9/1956 | United Kingdom | 180/29 |
| 1105966 | 3/1968 | United Kingdom | 280/11.1 R |
| 1113068 | 5/1968 | United Kingdom | 180/6.2 |
| 1286681 | 8/1972 | United Kingdom | 280/282 |

Primary Examiner—John J. Love
Assistant Examiner—Randall A. Schrecengost
Attorney, Agent, or Firm—Lawrence E. Laubscher

[57] ABSTRACT

A vehicle which rolls over the terrain to be traversed on rotatable balls rather than wheels, the vehicle having a support structure slung between the front and rear balls so that its lowest point of support for a rider of the vehicle is below the plane containing the axes of rotation of the balls. Conveniently the vehicle has only a single front and rear ball, the front ball being steerable, but the vehicle can have 3 or 4 balls. Preferably the balls are inflatable. The vehicle can also be motorized.

9 Claims, 3 Drawing Figures

VEHICLES

STATEMENT OF THE INVENTION

This invention relates to vehicles which roll over the terrain to be traversed on rotatable generally ball shaped members rather than wheels.

SUMMARY OF THE INVENTION

According to one aspect of the invention there is provided a vehicle comprising at least two generally shaped ball members between which a support structure is slung whose lowest point of support is located below the plane containing the axes of rotation of the ball shaped members.

The support structure can include one or more seats for just a single rider or a rider and passenger(s) but it must be shaped and mounted between the wheels so that the centre of gravity of the vehicle lies below the axle height of the ball members.

The vehicle can take a variety of forms. For instance, it can be used as a leisure vehicle for riding down hills along the lines of tobogganing or it can be used as a toy. Furthermore, by using two such vehicles, each of which has only two balls, a pair of grass skis can be readily provided.

Preferably, one of the ball members is additionally pivotally mounted for steering purposes. This provides a particular advantage for the vehicle over, for instance, a conventional toboggan as it means that the vehicle can be made to slalom down a gradient rather than coming straight down as on a toboggan, thereby increasing the descent time and increasing the enjoyment factor.

Any convenient form of steering arrangement may be used. In a preferred vehicle having only a front and rear ball member, a pair of spaced arms being provided at the front of the vehicle, each of which arms rotatably receives an axle end extending from opposite sides of the front ball member so that said axle end is movable along its respective arm to pivot the axle about its other end for steering purposes.

Conveniently each axle end is mounted in a slot extending along each arm, each axle end being movable in its slot in a direction away from the seat against a biassing force.

If desired a rudder bar may be attached to each axle end for foot actuation of the steering mechanism by the rider or the axle ends can extend laterally beyond the front arms to provide the rudder bars.

If the vehicle is to be used as a toy, it can be moulded or cast from a material with each arm rotatably locating the steerable ball member having a series of notches therealong, each of which is operable to receive and locate an axle end therein, said axle ends being movable along each arm, preferably against a biassing force such as a spring, to different ones of said notches for steering purposes. The toy vehicle should preferably include a movable balance weight which can be relative to the vehicle to encourage it to lean into the direction of turn set by the front ball member. The toy does not however have to be steerable but if it is not, then it must be balanced to remain upright.

Conveniently, the support structure is a seat which is a separate member attached to a chassis or frame but it is possible within the scope of the invention to mould the seat and chassis as an integral unit or even to use the seat as the chassis or support structure. This is particularly applicable to toy vehicles.

As an alternative form of steering, the vehicle seat can be mounted on a chassis or support structure with the front ball member being rotatably mounted in a steerable yoke itself pivotally mounted on said chassis at a point lying generally coplanar with the axes of rotation of the ball members.

The vehicles can include braking means and/or suspension systems if required. As it is preferred to use inflatable ball members, these usually provide an adequate air suspension for the rider. However, if solid or hollow rigid or semi-rigid balls are used, then some form of suspension might be needed.

The invention can also be applied to a ski comprising a pair of generally shaped ball members between which a supporting structure is slung, said structure having a portion to support a wearers foot, said foot supporting portion being located below the plane containing the axes of rotation of the ball members.

Whilst it is preferred to provide a vehicle with only one front and rear ball members, the vehicles of the invention can have three or more ball members. For instance, two at the rear and one, preferably steerable, at the front, or vice versa. A vehicle with four ball members is also possible. Also, a vehicle with more than one seat is possible.

BRIEF DESCRIPTION OF THE DRAWING

Preferred embodiments of the invention will now be described by way of example only with reference to the accompanying drawings in which.

DETAILED DESCRIPTION

Figure 1:
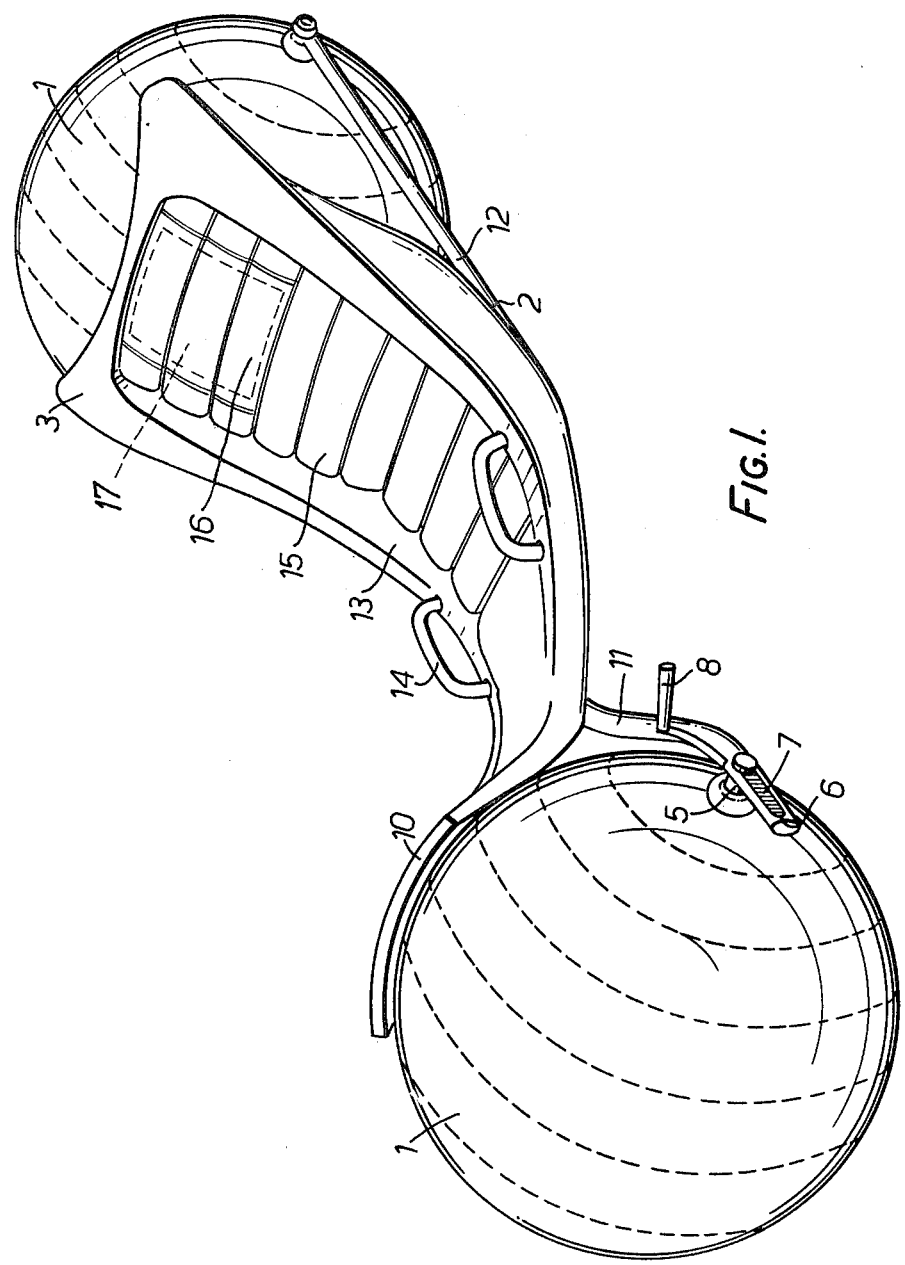
FIG. 1 shows a vehicle of the invention to be ridden by a person.

Referring to FIG. 1, there is shown a vehicle comprising a support structure in the form of a seat 3 mounted on a tubular ladder-type frame or chassis 2 whose opposite ends are splayed out at the front and rear of the vehicle to provide pairs of arms 11 and 12 for rotatably mounting therebetween balls 1 having a diameter of say 14". The frame can be made from any suitably strong material such as steel, alloy or reinforced plastics. Alternatively, a one piece integral chassis/seat could be used for instance as is illustrated in the FIG. 2 embodiment, the chassis/seat being injection moulded plastic, glass reinforced plastic or glass fibre.

In the illustrated vehicle, the front ball is steerable by means of an arrangement to be described in more detail hereinafter. However, the rear instead of the front ball could be steerable if desired. Seat 3 is fixed to the frame 2 between the balls 1, the seat being so designed that a rider of the vehicle lies generally prone rather than sitting upright in the seat.

An important feature of the vehicle is that its centre of gravity lies below the plane containing the axes of rotation of the balls. This means that the chassis or support structure 2 should be so designed that the lowest point of support of the seat mounted thereon is located just above the ground, for instance two or three inches. The seat or couch 3 is shaped in the form of a bucket seat with raised side portions 13 to provide good lateral location for the rider. Grab handles 14 are provided on these raised portions to give the rider increased stability during use of the vehicle. The seat 3 is preferably lined with a suitable form of cushioning 15 but this is not essential as the seat may be moulded to the contours of the rider's body.

As already mentioned, the front ball 1 of the vehicle is steerable. In the illustrated embodiment this is achieved by mounting axle stubs 5 projecting from each side of the ball 1 in a generally horizontally extending slot 6 provided in the end region of the front arms 11 of the chassis 2. Each slot 6 also houses a spring 7 which reacts against the axle stub 5 to normally bias it into the illustrated position. A rudder bar 8 is suitably attached to each axle stub 5 but instead the stub axle ends 5 may extend outwardly well beyond the arms 11 to provide rudder bars. With this arrangement, it will be seen that when a rider is lying in the hammock seat 3, his legs can rest on the rudder bars 8. When the rider pushes against one or other of the rudder bars, this causes the front ball to pivot about its opposite axle stub 5 as a result of which the ball turns. Thus the vehicle is provided with a very simple and effective steering arrangement.

Any suitable form of steering arrangement can be provided for one or other of the balls although it is important that the pivot axis for such a steering arrangement be generally coplanar with the axes of rotation of the balls. For instance, the front arms 11 rotatably mounting the front ball 1 could comprise a separate U-shaped yoke which is pivotally mounted to the remainder of the chassis 2 or the seat 3 about a pivot point generally coplanar with the axes of rotation of the balls.

In practice it has been found that the axle stub 5 need only be moved a short distance (for instance 3"–4") along the slot 6 to give an acceptable turning circle for the vehicle because it steers in much the same way as a bicycle in that the rider leans into the turn and thereby transfers his weight to one side of the vehicle which increases the turning effect. Instead of steering the vehicle using the feet, it is also possible to steer it by hand by connecting the steerable ball axle ends to suitable hand operated steering means such as a pair of levers, or a tiller bar or steering wheel.

The balls 1 are preferably inflatable and made from a resilient synthetic plastic material although other resilient materials could be used such as for instance natural or synthetic rubber. The balls may be of any shape but preferably generally their outer surface defines the major part of a sphere. If inflatable balls are used, one of the advantages of doing this is that the vehicle is provided with its own inbuilt air suspension so that no other supplemental suspension system is necessary. However, if desired a separate suspension can be provided, for instance by making the rear arms 12 of the chassis as separate trailing arms pivotally mounted to a central main portion of the chassis and mounting shock absorbing means such as a pair of coil springs between the movable trailing arms 12 and the rear side of the seat body. If desired some form of suspension means can be provided at the front of the vehicle using a similar arrangement. For instance, the front ball could be supported in a U-shaped frame or yoke (not shown) which is mounted on the chassis for pivotal movement from side to side for steering purposes, shock absorbing means such as coil springs being mounted between the steering arms 11 and a fixed forwardly extending portion 10 of the chassis 2 or seat 3. For most applications, it would only be desirable to provide additional suspension means at the rear of the vehicle as this is where most of the weight is concentrated.

Any suitable form of ball can be used provided it is of a resilient material such as synthetic plastic material or natural or synthetic rubber. However, it is preferred to use balls which have been manufactured by rotational casting. This is done by placing a flexible tube across the diameter of a circular mould together with the powder from which the ball is to be cast. The mould is then rotated at high speed and heated. The powder then melts and is thrown against the inner surface of the mould to form the ball. While this is happening, the cast surface of the ball also welds itself to the end portions of the flexible tube located in the mould, the result being that a hollow ball is formed having a very resilient outer surface and a central hole extending therethrough whose walls comprise a flexible tube of a similar or harder material and suitable for receiving and retaining a metal axle therein for rotation therewith or end located bearings for the axle. Preferably the flexible tube providing the central hole is of a diameter such that it makes a press fit with the metal axle to be inserted therein, the axle being tightly gripped by the flexible tube when the ball is inflated and therefore properly located therein. An advantage of this arrangement is that it makes it more difficult for the ball to slide along the axle during use and therefore the stub axles extending from each side of the balls tend to remain of constant length.

Instead of rotationally casting the ball with a tubular hole therethrough, it is possible to make the ball solid and provide diametrically opposed recesses in the surface thereof to receive spigot ends of a U-shaped hub supporting arrangement. It is also possible to cast the ball with a metal axle extending therethrough or with two separate stub axles in it, the ball being either inflatable or solid. Alternatively, a low density foam plastic material can be used to form the ball, having a stronger outer shell of a stronger material.

Figure 2:
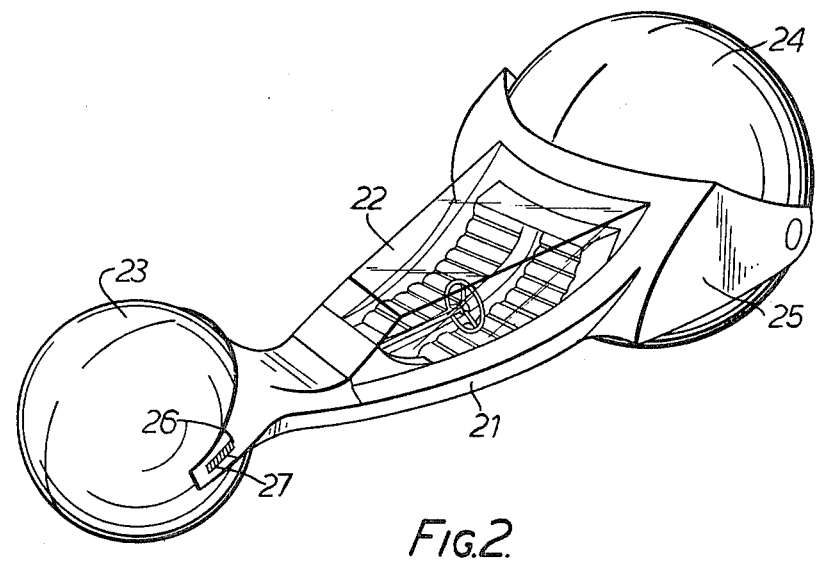
FIG. 2 shows a vehicle similar to that of FIG. 1 except that it is a toy and therefore substantially reduced in size.

If the vehicle is to be ridden by a person, the diameter of the balls would preferably be in the range 12 to 18 inches but other sized balls could be used depending on the use of the vehicle. If for instance it is to be a toy as illustrated in FIG. 2, the diameter of the balls would be between 3 and 8 inches whereas if the vehicle is to be ridden by children only, the ball diameters could be only 10". It will be appreciated that the dimensions given in the foregoing description are by way of example only and that any ball diameter size may be used depending on the intended use of the vehicle.

The vehicle can also be provided with some form of braking means. In FIG. 1, the brake comprises a brake pad 17 which is mounted behind the seat 3 to act against the rear ball 1, the brake being actuated by the rider pressing against a movable panel 16 in the seat or couch 3. The panel 16 is mounted on a part of the seat which is slidable for movement relative to the remainder of the seat body in a direction towards and away from the rear ball 1. A braking pad surface (not shown) having a high coefficient of friction such as a rubber pad is mounted on the reverse face of the movable panel 16 to cooperate with the ball and retard rotation thereof when brought into contact with it when the rider presses back against the movable panel 16. It will be appreciated that other forms of braking for the vehicle are possible. For instance, a drum brake mechanism mounted on the axle could be used on either or both of the front or rear balls, such a mechanism being operated from control means mounted on the seat 3, for instance by a cable or hydraulic linkage system. Alternatively, a disc brake mechanism could be attached to either or both of the front or rear axles, such a braking mechanism again being cable or hydraulically operated.

The vehicle illustrated in FIG. 2 of the drawings is very similar to that shown in FIG. 1 except that it is a toy and therefore of a much reduced size. However, it still comprises essentially the same parts as the vehicle shown in FIG. 1 in that it includes a moulded chassis 21 or supporting structure enclosing a cockpit 22 located between a front ball 23 and a rear ball 24 which is larger in size. The rear portion of the chassis 21 includes integral side extensions 25 which rotatably support the ball 24. The front ball 23 is similarly rotatably mounted in front extensions 26 of the chassis, the axle stubs (not shown) extending from the ball being mounted in a series of notches 27 or angularly spaced recesses arranged in the chassis extensions 26. The notches or angularly spaced recesses 27 define receiving positions for the axle stubs (not shown) of the ball 23 whereby the ball axis can be set in different positions in order to provide a set of fixed steering positions for the toy vehicle of FIG. 2.

Means are provided underneath the vehicle, preferably in cockpit area, for supporting a movable weight, the position of which relative to the chassis can be altered. Thus, if the weight is placed on one side of the vehicle and the axle stub on that side of the front ball 23 is moved to another notch in the series of notches 27, when the toy is pushed or driven by a motor, it will move round in a circle and return to its starting position. The balls 23 and 24 in this embodiment are not inflatable but they could be if so desired. Preferably, they are hollow and made from a hard synthetic plastics material but a solid ball could be used if so desired. The toy can be a free wheeler or it can be powered by any suitable means such as a spring, elastic band, flywheel or electric motor. It can also be radio controlled. If the steering mechanism is not used, the toy has to be balanced so that it stands upright.

Figure 3:
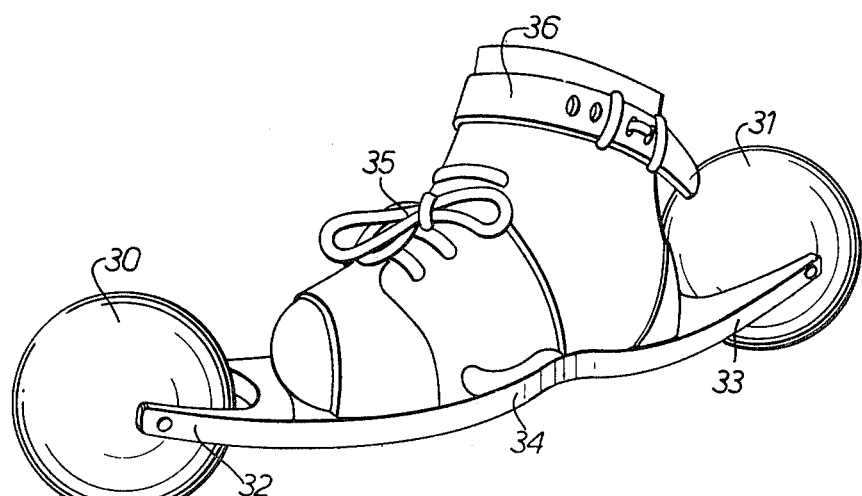
FIG. 3 shows an alternative embodiment of the invention in the form of a ski or skate for traversing rough terrain in dry conditions, e.g. grass skiing.

FIG. 3 shows another embodiment of the invention which is a form of ski for use on grass slopes. Each ski comprises a front and rear ball 30, 31 of any suitable diameter but 4" is preferred, each of which is rotatably mounted between front and rear forks 32, 33 of a support structure or chassis 26 which is concave in shape to ensure that its foot supporting surface is located below the plane containing the axes of rotation of the balls 22 and 23. Straps 35, 36 attached to the chassis 26 provide means for releasably attaching the skis to a wearer's foot or a boot could be secured to the chassis. Alternatively, snow ski mountings could be used. Neither of the balls is steerable in this embodiment. The balls can also be of different size.

The main advantage of vehicles similar to that shown in FIG. 1 is that they can slalom at speed on a gradient and traverse that gradient or even climb up it thereby enabling the rider to prolong his ride time down a given gradient. Such vehicles are also simple to balance and control as the seating position ensures a very low centre of gravity below axle height.

Desirably, the front and rear balls are of the same size but different sizes can be used. With different sized balls, the larger ball does not necessarily have to be at the rear of the vehicle. It could be at the front. Also the balls may be provided with a tread pattern to increase the cornering and stopping of the vehicle. The vehicle need not have only two balls as illustrated. Instead it could have three or four balls, for instance two at the rear and one at the front or vice versa or two at the front and two at the rear.

The vehicle can also be provided with a motor (not shown) mounted low down on the chassis, perferably behind or alongside the seat 3, the motor driving the front or rear ball in any suitable way. For instance, the motor could drive a sprocket keyed to the ball axle via a chain or alternatively it could drive an intermediate drive wheel spring biassed into engagement with the ball to make a friction drive therewith. The motor would be extremely light in relation to the overall weight of the vehicle and of small cubic capacity, for instance between 50 and 100 cc.

What I claim is:

1. A coaster vehicle, comprising
   (a) an elongated support structure;
   (b) first and second ground-engaging spherical members rotatably connected with opposite ends of said support structure, respectively, said spherical members being mounted for axial rotation about horizontal axes to permit forward movement of the vehicle generally longitudinally of said support structure, one of said spherical members also being connected with said support structure for pivotal movement about a vertical pivot axis;
   (c) a seat mounted intermediate the ends of said support structure, said support structure and said seat each having substantial portions extending below a line joining the horizontal axes of rotation of said spherical members, respectively, to cause the center of gravity of the vehicle to lie below the plane containing the horizontal axes of rotation of said spherical members; and
   (d) steering means operable by a passenger, when seated on said seat, for steering said one spherical member relative to said support structure, whereby the vehicle can be rocked to and fro about the ground-engaging surfaces of said spherical members in a direction transversely of said forward direction thereby to permit a seated passenger to steer the vehicle by use of said steering means and by laterally tilting the vehicle in said transverse direction.

2. Apparatus as defined in claim 1, wherein said support structure includes a tubular ladder-type frame upon which said seat is mounted.

3. Apparatus as defined in claim 1, wherein said spherical members are mounted for rotation on axles, respectively, said support structure including at each end a pair of spaced arms for receiving the ends of the associated axle, respectively, the spaced arms at one end of said support structure having longitudinally extending slots (6) receiving the ends of the associated axle (5), respectively, thereby permitting pivotal displacement of the axle about a vertical axis during the steering of said one spherical member.

4. Apparatus as defined in claim 3, and further including means (7) biasing the ends of said axle in a given direction longitudinally of said support structure.

5. Apparatus as defined in claim 3, and further including rudder bar means (8) operable by a foot of the passenger for pivoting said axle about a vertical axis, thereby to steer said vehicle.

6. Apparatus as defined in claim 3, wherein said slots contain notches (27) for selectively receiving the axle ends during the steering of the vehicle.

7. Apparatus as defined in claim 1, and further including brake means operable by a passenger, when seated on said seat, for braking the vehicle, said brake means including a brake pad movably connected with said support structure for engaging the surface of at least one of said spherical members.

8. Apparatus as defined in claim 1, wherein each spherical member is inflatable.

9. Apparatus as defined in claim 1, wherein each spherical member comprises a solid low density structure.

* * * * *